United States Patent
Lester et al.

(10) Patent No.: US 7,472,724 B2
(45) Date of Patent: Jan. 6, 2009

(54) METHOD AND APPARATUS FOR CREATING, USING, AND DISPENSING TUBES

(75) Inventors: Michael E. Lester, Burton, OH (US); Joseph Williams, IV, Hiram, OH (US)

(73) Assignee: Electrolock, Inc., Hiram, OH (US)

( * ) Notice: Subject to any disclaimer, the term of this patent is extended or adjusted under 35 U.S.C. 154(b) by 485 days.

(21) Appl. No.: 10/864,990

(22) Filed: Jun. 10, 2004

(65) Prior Publication Data

US 2005/0040277 A1    Feb. 24, 2005

Related U.S. Application Data

(60) Provisional application No. 60/541,709, filed on Feb. 3, 2004, provisional application No. 60/495,956, filed on Aug. 18, 2003.

(51) Int. Cl.
*F16L 11/00* (2006.01)

(52) U.S. Cl. .................. 138/129; 138/130; 138/145

(58) Field of Classification Search ............. 138/129, 138/130, 144, 145; 310/215; 174/120 R, 174/120 C, 120 SR, 110 FC, 110 N, 110 SR
See application file for complete search history.

(56) References Cited

U.S. PATENT DOCUMENTS

| | | | | |
|---|---|---|---|---|
| 2,778,964 A | * | 1/1957 | Balke | 310/214 |
| 2,985,780 A | | 5/1961 | Bigelow et al. | 310/215 |
| 3,627,624 A | | 12/1971 | Kreuz et al. | 428/339 |
| 3,721,269 A | | 3/1973 | Choate et al. | 138/119 |
| 3,745,394 A | | 7/1973 | Mason | 310/215 |
| 3,778,890 A | | 12/1973 | Schlaudroff | 29/596 |
| 4,160,926 A | | 7/1979 | Cope et al. | 310/215 |
| 4,239,064 A | * | 12/1980 | Gilman | 138/154 |
| 4,275,319 A | | 6/1981 | Davis, Jr. | 310/43 |
| 4,374,299 A | * | 2/1983 | Kincaid | 174/36 |
| 4,381,210 A | | 4/1983 | Ishizuka et al. | 156/195 |
| 4,501,780 A | | 2/1985 | Walters et al. | 428/34.9 |
| 4,510,301 A | | 4/1985 | Levy | 526/254 |
| 4,602,180 A | | 7/1986 | Olson | 310/215 |
| 4,788,089 A | * | 11/1988 | Skipper | 428/34.9 |
| 4,808,872 A | | 2/1989 | Lund et al. | 310/215 |
| 4,833,354 A | | 5/1989 | Miller | 310/87 |
| 4,876,473 A | | 10/1989 | Tanaka et al. | 310/216 |

(Continued)

FOREIGN PATENT DOCUMENTS

EP    1225334 A1 *    7/2002

*Primary Examiner*—Patrick F Brinson
(74) *Attorney, Agent, or Firm*—Pearne & Gordon LLP

(57) ABSTRACT

The present invention includes a method of lining a core slot that includes the steps of unwinding a tube, separating a portion of the tube, inserting the tube into a core slot, and expanding the tube to line the core slot. The present invention also includes a continuous piece of helically-wound tubing that is wound on a spool along with an apparatus and method used for creating the spool of tubing. The method includes the steps of helically wrapping a web of material in an overlapping relationship to form a helically-wound tube, advancing the tube in a longitudinal direction of the tube and winding the tube onto a spool while at least a portion of the tube is being formed by the step of helically-wrapping. Method variations in which one or more of the aforementioned steps may be eliminated as appropriate, can be used for many other uses.

23 Claims, 4 Drawing Sheets

U.S. PATENT DOCUMENTS

| | | | |
|---|---|---|---|
| 4,922,165 A | 5/1990 | Crawford et al. | 310/215 |
| 5,094,659 A | 3/1992 | Schwartz | 493/309 |
| 5,218,170 A * | 6/1993 | Ferlier et al. | 174/120 R |
| 5,220,133 A * | 6/1993 | Sutherland et al. | 174/120 R |
| 5,306,976 A | 4/1994 | Beckman | 310/215 |
| 5,319,269 A | 6/1994 | Bryant | 310/43 |
| 5,414,215 A * | 5/1995 | Dunand et al. | 174/113 R |
| 5,759,655 A | 6/1998 | Kitajima et al. | 428/36.91 |
| 5,763,978 A | 6/1998 | Uchida et al. | 310/215 |
| 5,845,389 A | 12/1998 | Roberts et al. | 29/596 |
| 5,877,574 A | 3/1999 | Molnar | 310/215 |
| 5,952,761 A | 9/1999 | Itoh et al. | 310/215 |
| 6,016,848 A | 1/2000 | Egres, Jr. | 138/137 |
| 6,024,131 A | 2/2000 | Lester et al. | 138/121 |
| 6,065,204 A | 5/2000 | DeHart | 29/734 |
| 6,147,430 A | 11/2000 | Kusase et al. | 310/215 |
| 6,176,691 B1 | 1/2001 | Tsubokawa | 310/215 X |
| 6,400,056 B1 | 6/2002 | Naka et al. | 310/215 |
| 6,570,284 B1 | 5/2003 | Agnes et al. | 310/89 |
| 6,590,310 B2 | 7/2003 | Takano | 310/254 |
| 6,598,421 B1 * | 7/2003 | Suzuki et al. | 62/498 |
| 6,969,940 B2 | 11/2005 | Dalrymple et al. | 310/215 |
| 2001/0011852 A1 | 8/2001 | Nakamura et al. | 310/215 |
| 2002/0089250 A1 | 7/2002 | Naka et al. | 310/215 |
| 2002/0104606 A1 | 8/2002 | Ohzuru et al. | 156/140 |
| 2002/0134850 A1 | 9/2002 | Hollenberg | 239/33 |
| 2003/0062644 A1 | 4/2003 | Oyase et al. | 264/41 |
| 2003/0127936 A1 | 7/2003 | Katou et al. | 310/215 |

* cited by examiner

METHOD AND APPARATUS FOR CREATING, USING, AND DISPENSING TUBES

CROSS-REFERENCE TO RELATED APPLICATION

This application claims the benefit of U.S. patent application 60/495,956 filed Aug. 18, 2003 and U.S. patent application 60/541,709 filed on Feb. 5, 2004, the contents of which are incorporated herein by reference.

BACKGROUND OF THE INVENTION

1. Field of the Invention

The present invention relates to tubing and more specifically to tubing that is wound up on a spool along with a method and apparatus used for making and dispensing the tubing. The tubing can be used as protective covering, as insulation, to package items together, or any other use as suitable.

2. Description of Related Art

In order to provide tubing to be used as protective coverings and insulators, a plurality of tubes was formed, cut to a pre-determined length, then shipped en bulk to be used. This method of creating and shipping tubes creates inefficiencies in storage and shipping.

BRIEF SUMMARY OF THE INVENTION

The present invention includes a method of lining a core slot that includes the steps of unwinding a tube, separating a portion of the tube, inserting the tube into a core slot, and expanding the tube to line the core slot. The present invention also includes an apparatus and method for creating a continuous piece of helically-wound tubing that is wound up on a spool. The steps used to create the tubing that is wound on a spool include helically wrapping a web of material in an overlapping relationship to form a helically-wound tube, advancing the helically wound tube in a longitudinal direction of the tube and winding the tube onto a spool while at least a portion of the tube is being formed by the step of helically-wrapping. In addition, the present invention includes a spool of tubing, a device for unwinding the tubing from the spool, and a device for separating a portion of the tubing. The tubing can be helically-wound. The tubing can also be linearly-seamed. Variations on the aforementioned methods, in which one or more of the steps may be eliminated as appropriate, can be used for many uses such as packaging items together, protecting items, insulating items, or any other use as appropriate.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
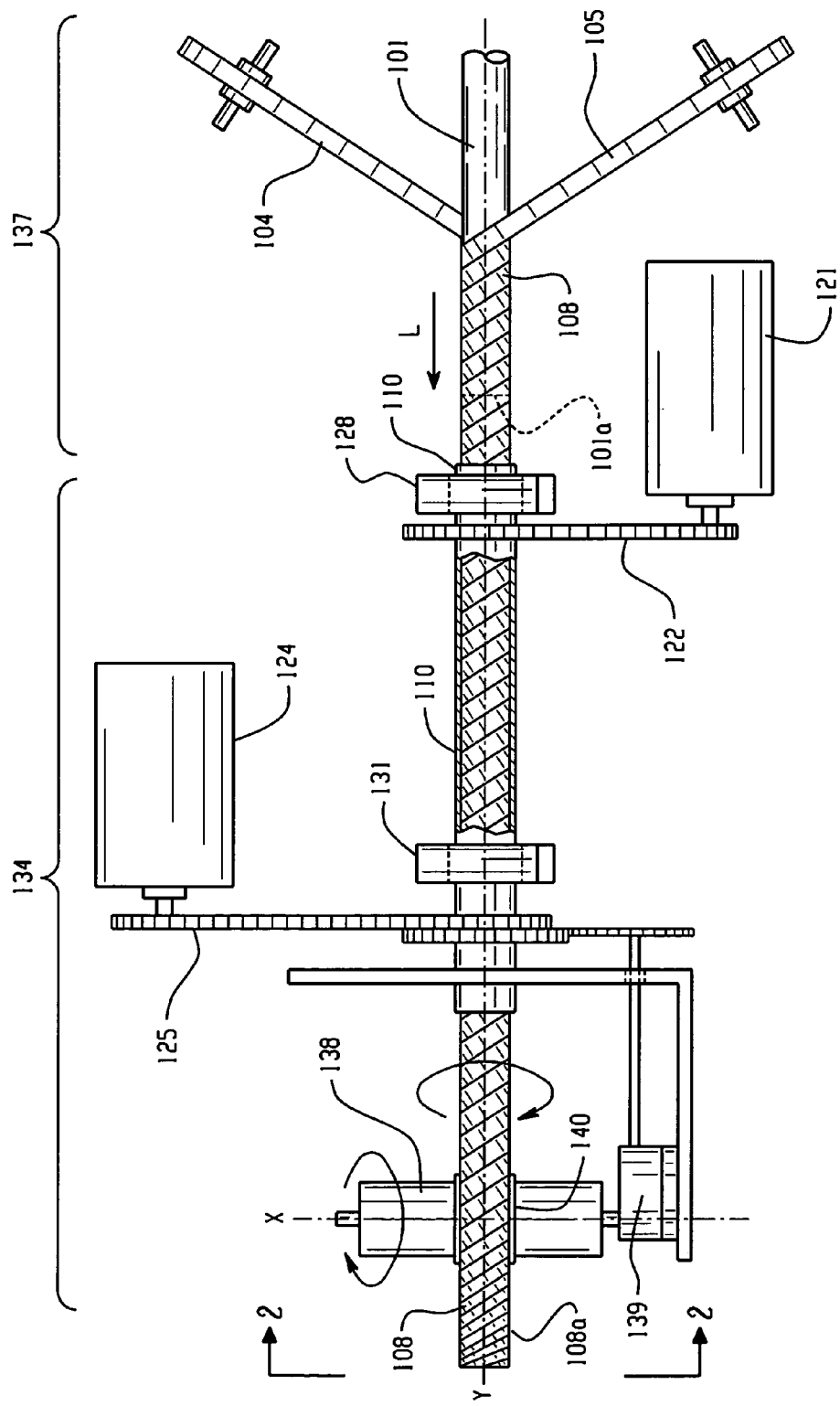
FIG. 1 is a plan view of an apparatus and method for forming a continuous piece of a helically-wound tube according to the present invention.
Figure 3:
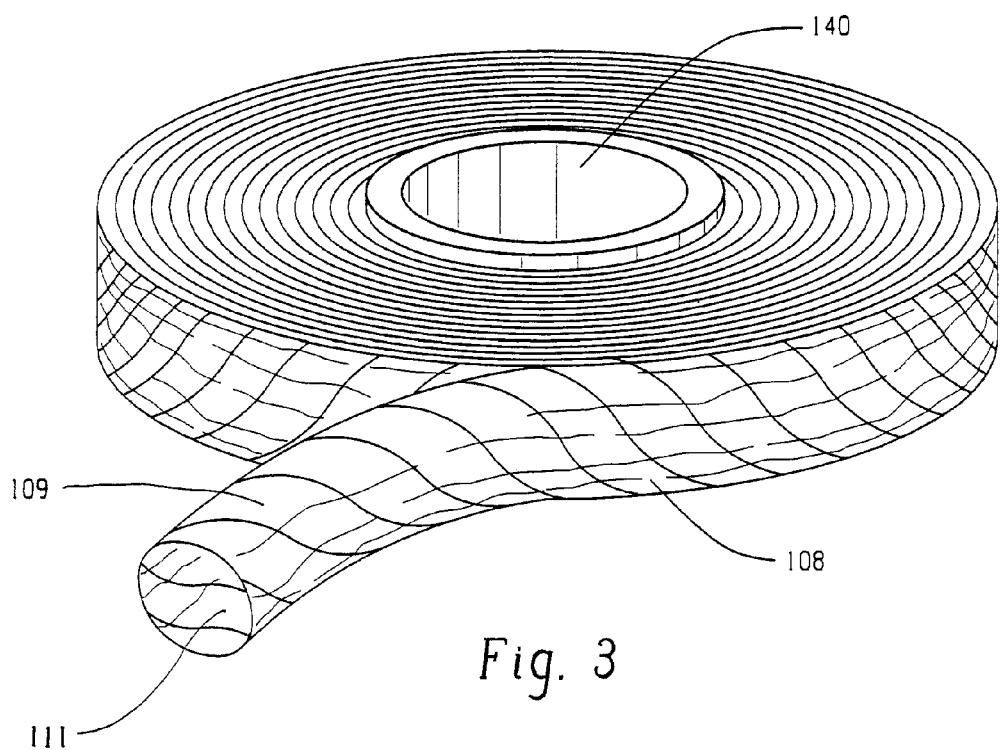
FIG. 3 is a view of a helically-wound tube wound up on a spool.
Figure 5:
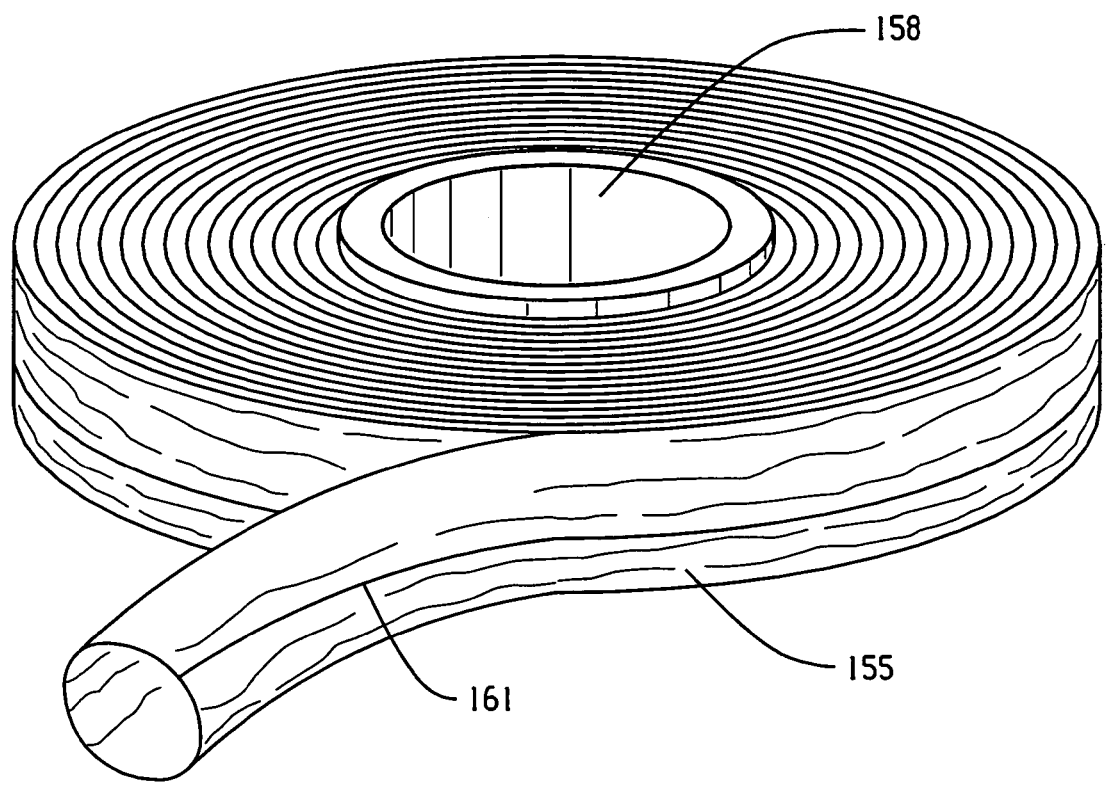
FIG. 5 is a view of a linearly-seamed tube wound up on a spool.

FIG. 1 illustrates a method and apparatus for creating a continuous piece of a helically-wound tubing or tubular substrate 108 that is wound up on a spool 140. One or more webs of material 104, 105 are helically wrapped in an overlapping relationship to form a helically wound tube or tubular substrate 108 that is essentially lacking any folds or pleats that are positioned substantially axially to the longitudinal axis of the tube or tubular substrate as can be seen in FIGS. 1, 3 and 5. The helically-wound tube 108 is advanced in a longitudinal direction L of the helically-wound tube 108. As the helically-wound tube 108 is formed, a leading end 108a is wound onto a spool 140 while the helically-wound tube 108 is still a continuous piece. As the helically-wound tube is wound onto the spool 140, the helically-wound tube 108 is at least partially flattened due to the winding onto the spool 140. The resultant product is a spool of a continuous helically-wound tube 108 as shown in FIG. 3.

In the current embodiment, webs of material 104,105 are fed from supply rolls to a first mandrel 101. The first or inner web 104 is helically wrapped about the first mandrel 101 with traverse edges overlapping to form a first layer. The second or outer web 105 is helically wrapped about the first mandrel 101 on the top surface of the first web 104 to form a second layer. Such an arrangement forms a helically-wound tube 108 on the first mandrel 101 having two layers 104, 105 of material. It should be noted, however, that additional webs of material could be fed to form a helically-wound tube 108 having more than two layers of material. For example, a third web can be fed to form a helically-wound tube having three layers of material. In the alternative, a single web of material could be helically wrapped to form a helically-wound tube 108.

The webs 104, 105 can be provided with a layer of adhesive on the side to be secured to the other web 104, 105. Therefore, the adhesive is located on the top or outer side of the first or inner web 104 and the bottom or inner side of the second web 105 and any subsequent webs. The layer of adhesive can be of any suitable material for forming the helically-wound tube 108. For example, the adhesive can be a water-based polyester adhesive. For further description of making helically-wound tubing see U.S. Pat. No. 6,024,131 to Lester et al., the disclosure of which is incorporated herein by reference.

After being formed, the helically-wound tube 108 is rotating helically about the Y axis while traveling in the longitudinal direction L as it exits the first mandrel 101 at the end 101a. After leaving the end 101a of the first mandrel 101, the helically-wound tube 108 then travels through the hollow shaft 110 to get to a rewind apparatus 134. In order to package the helically-wound tube 108 in continuous lengths, a novel rewind apparatus 134 is required.

The rewind apparatus 134 must rotate in two directions, about the X axis and about the Y axis, simultaneously. The helically-wound tube 108 exits the first mandrel 101 rotating helically about the Y axis. Consequently, the spool 140 must also rotate helically about the Y axis. This rotation of the spool 140 about the Y axis must be precisely synchronized with the rotation of the helically-wound tube 108 about the Y axis to prevent the helically-wound tube 108 from being twisted. The spool 140 must simultaneously be rotating about the X axis in order to wind the helically-wound tube 108 onto the spool 140 in a continuous length while at least a portion of the helically-wound tube 108 is being formed by the tube forming apparatus 137. In the current embodiment, the spool 140 is rotating about the X axis via a second mandrel 138.

Figure 2:
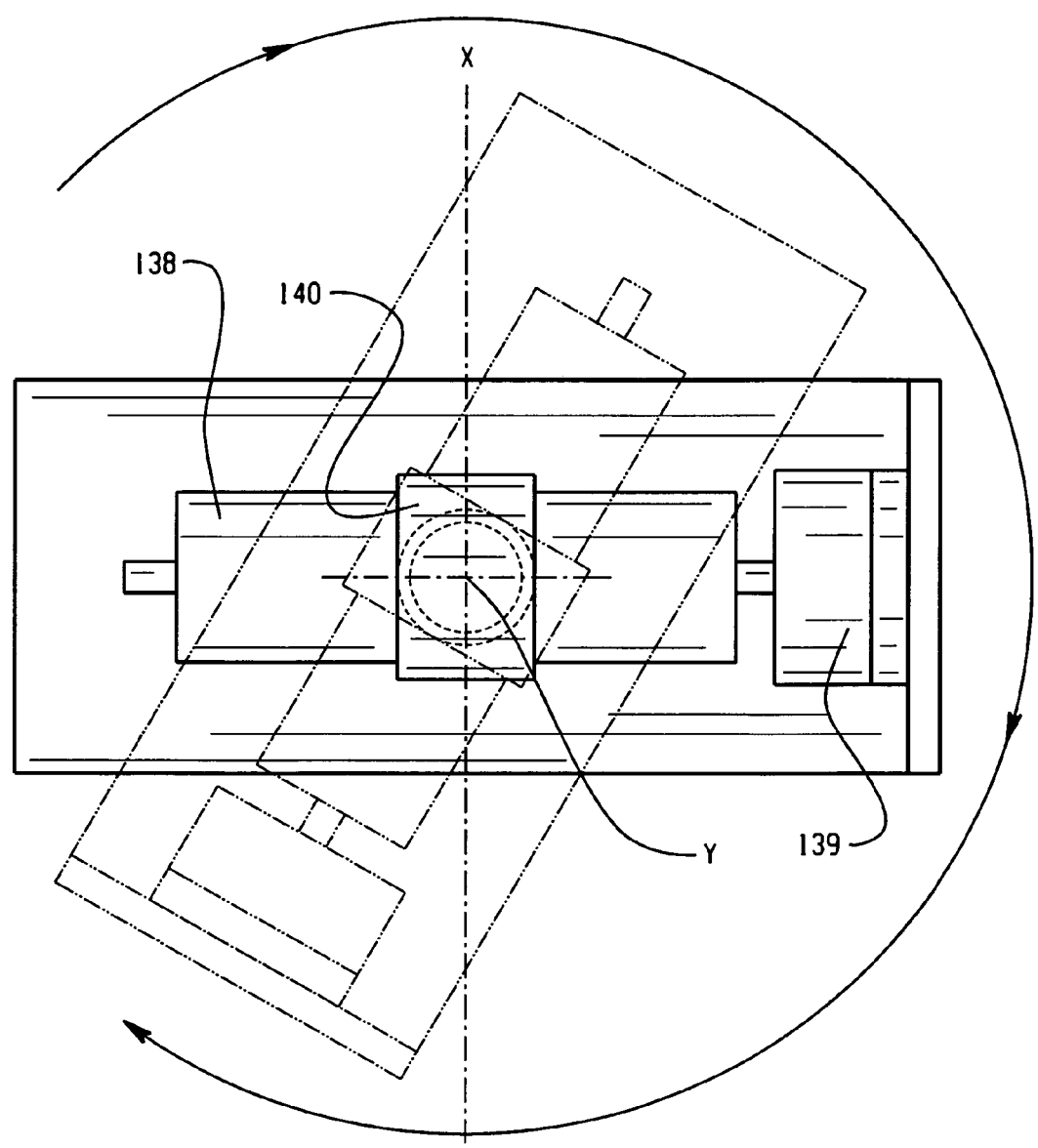
FIG. 2 is a longitudinal view of FIG. 1, taken along line 2-2 of FIG. 1.

FIG. 2 is a longitudinal view of FIG. 1, taken along line 2-2 of FIG. 1. For clarity, the helically-wound tube 108 is not shown in FIG. 2. FIG. 2 exemplifies how the second mandrel 138, the spool 140, and the gear reducer 139 rotate about the Y axis while the helically-wound tube 108 is wound onto the spool 140 by rotating the second mandrel 138 and the spool 140 about the X axis.

As exemplified by FIG. 1, in the current embodiment, attached motors 121, 124 provide the necessary rotational force. As shown, timing belts 122, 125 can be used to keep the rewind apparatus 134 working in synchronization with the tube forming apparatus 137. Bearings 128, 131 are used to reduce friction and wear while supporting rotating elements, such as the helically-wound tube 108.

The final product of the aforementioned process is a helically-wound tube 108 of a continuous length wound up on a spool 140 as shown in FIG. 3. In the current embodiment, the spool 140 is a so-called "flat-pad" spool, meaning that the helically-wound tube 108 is wound up with each layer is lined up with the previous layer and wound substantially directly on top of the previous layer. However, alternatively, the spool 140 could be a so-called "traverse" spool, where each layer is wound up in a traverse pattern, or the helically-wound tube could be wound in any other suitable way.

The helically-wound tube 108 can comprise a dielectric layer as a substrate with a release coating at least partially coating a side of the dielectric layer, i.e., at least partially coating one of the outer side 109 and inner side 111 of the helically-wound substrate 108. An example of a dielectric substance is a polyimide. A polyimide is a tough durable polymer that contains an inido group. Other dielectric substances can be used as appropriate. The release coating can comprise a fluororesin. The fluororesin may comprise PTFE (polytetrafluoroethylene), PFA (tetrafluoroethylene-perfluoroalkylvinylether copolymer), FEP (tetrafluoroethylene-hexafluoropropylene copolymer), other fluoropolymers, a blend thereof, or the like. The release coating is used to reduce friction. The helically-wound tube 108 can be at least partially coated with the release coating prior to the forming of the tube, anytime during the process of forming the tube, or after formation.

The helically-wound tube 108 comprised of a dielectric layer with a release coating can be used as protective sleeves or insulation sleeves for anything that needs protection or insulation. For example, the tubes can be used as slot liners to line the slots of a stator core in which case the tubes would be configured to line the slots of the stator core and the outer surface of each of the tubes would comprise a surface configured for contacting a wall of the slot. Examples of other items that could be protected or insulated by the tubes configured to protect or insulate include cables, such as coaxial cables, any electrical devices, electrical wires, non-electric wires, batteries (used as battery sleeves), or any other item that could use a protective or insulating sleeve configured to accomplish the task of protecting or insulating. In the alternative, the tubes can be configured so as to be capable of being used for packaging items to hold them together, without serving as insulation or protection per se.

Figure 4:
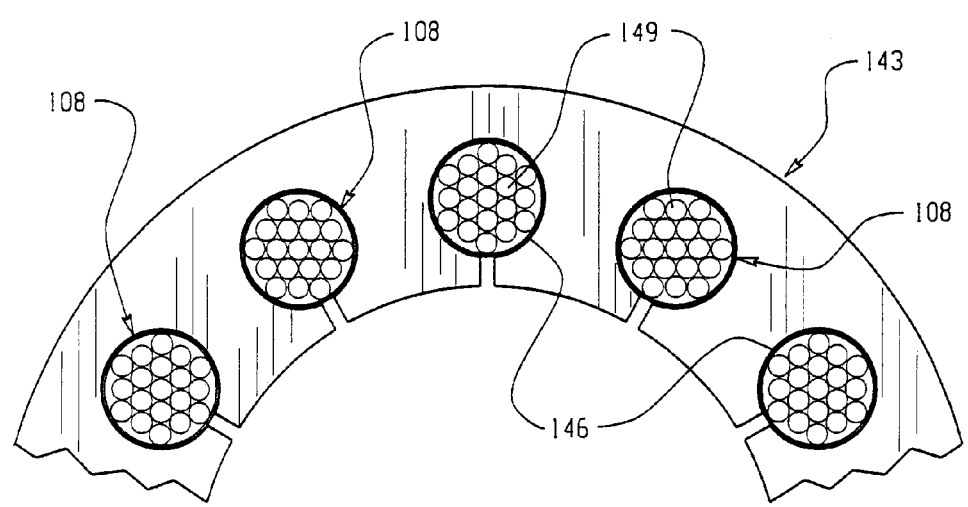
FIG. 4 is a view of a portion of a stator core of a rotary electric machine with core slots lined with a helically-wound tube.

FIG. 4 shows an example of a portion of a stator core 143 of a rotary electric machine with core slots 146 lined with a separated portion of the helically-wound tube 108. The helically-wound tube 108 insulates the wires or conductor segments 149 from the stator core 143. Axial ends of the conductor segments 149 are connected to one another forming a stator winding of the rotary electric machine.

According to one aspect of the present invention, tube-shaped slot liners are produced from a spool 140 comprising a continuous length of a helically-wound tube 108 wound thereon. The helically-wound tube 108 is unwound from the spool 140 and a portion of helically-wound tube 108 is cut or otherwise separated from the continuous length of the helically-wound tube 108. The separated portion of the helically-wound tube 108 is then inserted as a slot liner into a core slot 146. The separated portion of helically-wound tube 108 is then expanded to line the core slot 146. In the alternative, these steps can be performed substantially simultaneously or in any other feasible order.

The unwinding of the helically-wound tube 108 from the spool 140 can be accomplished in any of a number of ways. One way to unwind the helically-wound tube 108 would be to manually unwind the helically-wound tube 108. Another way to unwind the helically-wound tube 108 would be via a mechanical or electro-mechanical device. Alternatively, any of a number of techniques could be used to accomplish the step of unwinding the helically-wound tube 108 from the spool 140.

Once the helically-wound tube 108 is unwound, a portion needs to be separated. This separation can occur before, during, or after insertion into the core slot 146. It is contemplated that there are a number of ways to accomplish this separation objective. One way would be to cut the helically-wound tube 108 with a tube-cutting device, such as with scissors, a knife, a laser, or any other apparatus that could be used to separate portions of the helically-wound tube 108. Alternatively, any of a number of tube-separating techniques could be used to accomplish the tube-separating objective.

There are a number of ways to insert the helically-wound tube 108 into the core slot 146. One way would be to manually place the helically-wound tube 108 inside the core slot 146. Another way would be via an automated machine. Also, before inserting the helically-wound tube 108 into the core slot 146, the helically-wound tube 108 could be deformed to ease insertion. Examples of ways the helically-wound tube 108 could be deformed comprise flattening the helically-wound tube 108, forming the helically-wound tube 108 into a U-shape, or any other deformation that eases insertion into the core slot 146. Alternatively, any of a number of suitable techniques could be used to insert the helically-wound tube 108 into the core slot 146.

The step of expanding the helically-wound tube 108 can be accomplished in a number of ways. For example, the helically-wound tube 108 can be blown open with air. Another way to expand the helically-wound tube 108 would be to insert an object inside the helically-wound tube 108 and push it open. Examples of objects that could be used to push the helically-wound tube 108 open include a hand, a rod, a pole, or any other suitable object. Another way to expand the helically-wound tube 108 would be to push it open by passing the helically-wound tube 108 through adjacent rollers which are arranged substantially transverse to the central axis of the tube. Alternatively, any of a number of tube-expanding techniques could be used to expand the helically-wound tube 108 to line the core slot 146.

It is contemplated that each of the aforementioned steps is applicable to tubes that are not helically-wound tubes 108. For example, the tube could be a linearly-seamed tube 155, which could be wound up on a second spool 158, as shown in FIG. 5. Any of a number of well-known techniques can be used to create the linearly-seamed tube 155. For example, the edges of a flat sheet of suitable material can be glued or welded together to form the linear seam 161 of the linearly-seamed tube 155.

It is also contemplated that the tube does not have to be cylindrical as shown in FIG. 1, FIG. 3, FIG. 4, and FIG. 5. In the alternative, the tube could have a rectangular cross-section or any other suitable shape that would be appropriate or of a configuration to fit the particular slot to be lined It is contemplated that each of the aforementioned steps has applications for uses of helically-wound tubes 108, linearly-seamed tubes 155, and other tubes, other than for lining core slots 146. For example, variations of this method in which one or more of the steps may be eliminated as appropriate, can be used for packaging items together, protecting items or insulating items. Examples of items that could be packaged together, protected, or insulated by using the aforementioned method include cables, such as coaxial cables, electrical wires, other electrical devices, non-electric wires, batteries (use as battery sleeves), or any other item that could be packaged together, protected, or insulated.

Although the invention is shown and described with respect to certain preferred embodiments, equivalents and modifications will occur to others skilled in the art upon the reading and understanding of the specification. The present invention includes all such equivalents and modifications, and is limited only by the scope of the claims.

What is claimed is:

1. A helically-wound tube comprising:
   one or more webs of a dielectric material, each web being continuously and helically-wound in an overlapping relationship to form a helically-wound tubular substrate that is essentially lacking any folds or pleats that are positioned substantially axially to the longitudinal axis of the tubular substrate and having an outer side and an inner side;
   a layer of adhesive provided between overlapping portions of each one or more webs and/or between each web that is secured to another web; and
   a release coating at least partially coating one of the outer side and inner side of the helically-wound tubular substrate, said release coating reducing the friction of the outer side and/or inner side of the tubular substrate coated with the release coating.

2. The helically-wound tube according to claim 1, wherein the release coating comprises a fluororesin.

3. The helically-wound tube according to claim 2, wherein the fluororesin comprises at least one compound selected from the group comprising PTFE, PFA, and FEP.

4. The helically-wound tube according to claim 1, wherein the dielectric material comprises a polyimide.

5. The helically-wound tube according to claim 1, wherein the tube is a slot liner that is configured to line a slot of a core and the outer side of the tube comprises a surface configured for contacting a wall of the slot.

6. The helically-wound tube according to claim 5, wherein the release coating comprises a fluororesin.

7. The helically-wound tube according to claim 6, wherein the fluororesin comprises at least one compound selected from the group comprising PTFE, PFA, and FEP.

8. The helically-wound tube according to claim 5, wherein the dielectric material comprises a polyimide.

9. The helically-wound tube of claim 1 including a spool on which the tube is wound.

10. The helically-wound tube of claim 4 including a spool on which the tube is wound.

11. The helically-wound tube of claim 5 including a spool on which the tube is wound.

12. The helically-wound tube of claim 8 including a spool on which the tube is wound.

13. The helically-wound tube of claim 9, wherein the helically-wound tube is at least partially flattened as wound up on the spool.

14. The helically-wound tube of claim 10, wherein the helically-wound tube is at least partially flattened as wound up on the spool.

15. The helically-wound tube of claim 11, wherein the helically-wound tube is at least partially flattened as wound up on the spool.

16. The helically-wound tube of claim 12, wherein the helically-wound tube is at least partially flattened as wound up on the spool.

17. The helically-wound tube of claim 1 wherein, the helically-wound tube comprises at least two webs of a dielectric material.

18. The helically-wound tube of claim 5 wherein, the helically-wound tube comprises at least two webs of a dielectric material.

19. The helically-wound tube of claim 9 wherein, the helically-wound tube comprises at least two webs of a dielectric material.

20. The helically-wound tube of claim 13 wherein, the helically-wound tube comprises at least two webs of a dielectric material.

21. The helically-wound tube according to claim 13, wherein the release coating comprises a fluororesin.

22. The helically-wound tube according to claim 21, wherein the fluororesin comprises at least one compound selected from the group comprising PTFE, PFA, and FEP.

23. The helically-wound tube according to claim 13, wherein the dielectric material comprises a polyimide.

* * * * *